No. 806,560. PATENTED DEC. 5, 1905.
E. F. NORTHRUP.
ELECTRICAL MEASURING INSTRUMENT.
APPLICATION FILED MAY 12, 1905.
3 SHEETS—SHEET 1.

Witnesses
Inventor
E. F. Northrup,
by John H. Kalk
His Attorney

No. 806,560. PATENTED DEC. 5, 1905.
E. F. NORTHRUP.
ELECTRICAL MEASURING INSTRUMENT.
APPLICATION FILED MAY 12, 1905.
3 SHEETS—SHEET 2.
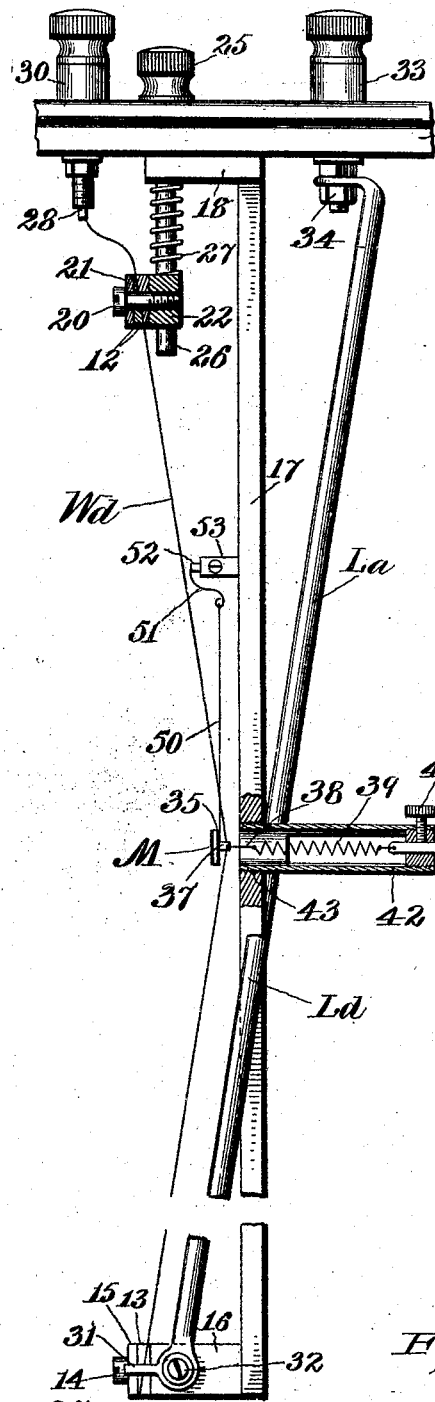
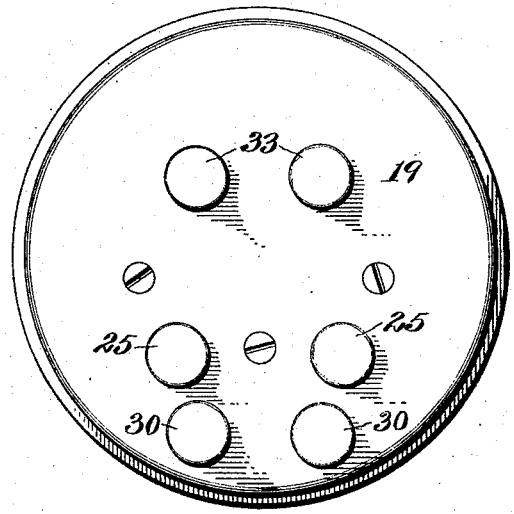
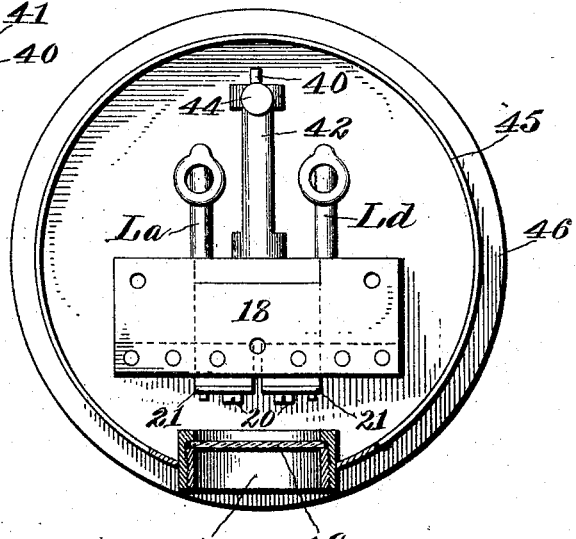
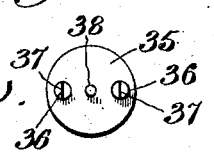
Witnesses
Inventor
E. F. Northrup
by John H. Hale
Attorney No. 806,560. PATENTED DEC. 5, 1905.
E. F. NORTHRUP.
ELECTRICAL MEASURING INSTRUMENT.
APPLICATION FILED MAY 12, 1905.

3 SHEETS—SHEET 3.

Witnesses
J. R. Martin
W. Schoenborn

Inventor
E. F. Northrup
by John H. Holt
his Attorney

UNITED STATES PATENT OFFICE.

EDWIN F. NORTHRUP, OF PHILADELPHIA, PENNSYLVANIA, ASSIGNOR TO LEEDS AND NORTHRUP COMPANY, OF PHILADELPHIA, PENNSYLVANIA, A CORPORATION OF PENNSYLVANIA.

ELECTRICAL MEASURING INSTRUMENT.

No. 806,560.  Specification of Letters Patent.  Patented Dec. 5, 1905.

Application filed May 12, 1905. Serial No. 260,075.

*To all whom it may concern:*

Be it known that I, EDWIN F. NORTHRUP, a citizen of the United States, residing at Philadelphia, in the county of Philadelphia and State of Pennsylvania, have invented certain new and useful Improvements in Electrical Measuring Instruments, of which the following is a specification.

The instrument and methods of measurement constituting this invention and herein described were developed with the object of filling the frequent need of a means of easily and accurately calibrating alternating-current instruments—such as ammeters, voltmeters, electrodynamometers, and the like—whatever their capacity and also of supplying an inexpensive method of measuring with high precision very large alternating currents regardless of their wave form or frequency, such instrument and methods further proving sufficient for accurate measurement of currents of too great a frequency for the application of ordinary methods.

The above-stated objects have been successfully accomplished principally for the following reasons: The instrument is used as a zero instrument and does not depend upon any calibration or the determination of a constant therefor. It operates with extreme sensitiveness and being perfectly "dead-beat" is suited for work with fluctuating currents. It may be used with or without low-resistance shunts, and when used with these it has an unlimited upward range of current measurement, while without them its lower range is down to two to five milliamperes, and, finally, as the operation of the instrument depends upon the heating effect of currents it is wholly independent of wave form or frequency.

In order to fully describe the said invention, reference will be had to the accompanying drawings, in which—

Figure 1:
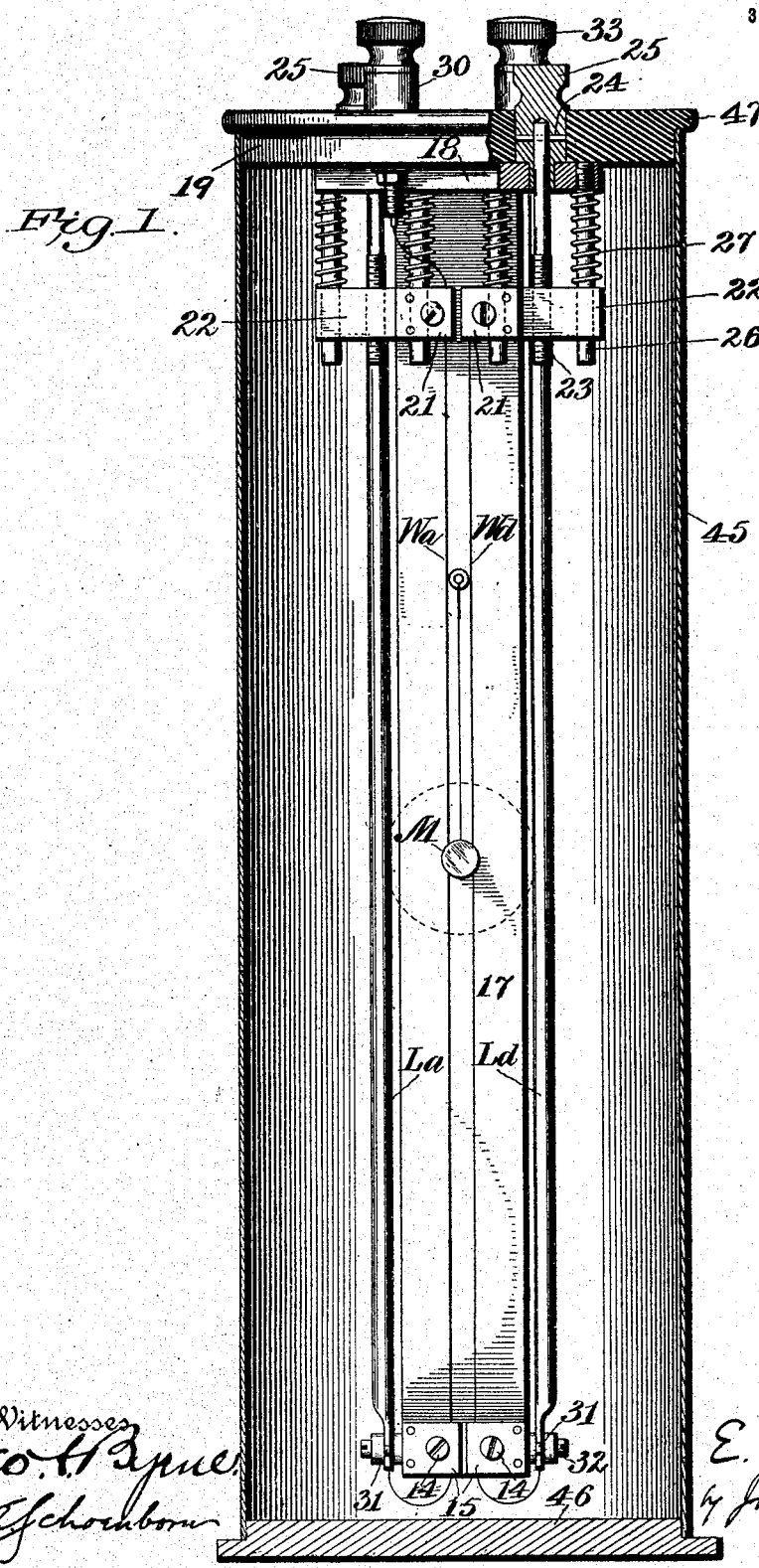

Figure 1 represents a central vertical section through the containing-case of a form of instrument constructed according to this invention, showing the parts contained in said case in front elevation with a portion of the top of the instrument broken away; Fig. 2, a side elevation of the parts removed from said containing-case with portions broken away and shown in section; Fig. 3, a top plan view of the instrument with cover on the containing-case; Fig. 4, a top plan view of the instrument with cover removed and showing a portion of the front of the containing-case broken away; Fig. 5, a bottom plan view of the mirror-supporting disk, and Figs. 6 and 7 diagrams to illustrate the theory and use of the instrument.

Referring to the accompanying drawings, $Wa$ and $Wd$ represent two small wires of, preferably, No. 33 hard-drawn silver wire when shunts are used. These wires lie parallel to each other at a distance apart of about five thirty-seconds of an inch and are held near their extremities by wedge-shaped ivory clamps 12 and 13. The ivory clamps 13 are held fast by means of screws 14 and plates 15 against a rigid support 16, carried at the end of a frame 17, of brass or other suitable material, having at its upper end a supporting member 18, which is made fast to the lower side of a hard-rubber top 19 of the containing-case. The two upper ivory clamps 12, holding the said wires near their upper extremity, are held fast by means of screws 20 and plates 21 against two separately-adjustable supports 22. These supports 22 are made separately adjustable by being screw-threaded on separate adjusting-screws 23, which pass upward through the supporting member 18 and hard-rubber top 19, where they are made fast each, as by a pin 24, to a separate milled adjusting-head 25. Fixed guide-rods 26 extend from the fixed supporting member 18 through the movable supports 22 and are provided each with a spring 27 to prevent lost motion when the supports 22 are adjusted. The upper ends of the wires $Wa$ and $Wd$ are soldered direct to the lower ends 28 of the binding-posts 30, while the lower ends of said wires are soldered to lugs 31 on the lower ends of the heavy copper leads $La$ and $Ld$, made fast to the side of the support 16 by screws 32 and connected at their upper ends to the lower ends of binding-posts 33 by nuts 34.

M represents a mirror about one-half of an inch in diameter and located at a point about midway between the clamped ends of the wires $Wa$ and $Wd$. This mirror is mounted upon a small ivory disk 35, having upon its back two small agate bearing-blocks 36, (see Fig. 5,) provided with parallel slots 37, which are adapted to engage the wires $Wa$ and $Wd$. Fastened to the center of the back of the disk 35 and half-way between the wires $Wa$ and $Wd$ when the disk is on the wires is a small hook 38, which is secured to a spring 39, made fast at its other end to an adjustable plug 40, passing through a screw-threaded plug 41 in the end of a tube 42, screwed at its other end into an opening 43 in the frame 17 in line with the mirror. The plug 41 is clamped in the proper position by the thumb-screw 44. Under the tension of this spring 39 the mirror-support is held in place on the wires $Wa$ and $Wd$, causing at the same time the wires to bend back about seven-eighths of an inch out of a straight line, as shown most clearly in Fig. 2.

The frame 17, with its attached parts, is let down into a preferably circular metal case 45, closed at its bottom by a suitable base 46. The hard-rubber cover 19 fits snugly into the top of the case and is supported by means of the annular flange 47. The case 45 is provided opposite the front of the mirror with a window 48, into which is set a glass 49.

If the wires $Wa$ and $Wd$ are very fine, it is preferable to provide additional supporting means for the mirror, such as the silk fiber 50, secured at one end to the back of the ivory disk 35 and at its other end to a small hook 51, secured to a plug 52, adjustably mounted in a support 53.

It is evident now that if by the adjusting-screws the tension of the two wires has been properly adjusted the plane of the mirror will be vertical to a line drawn in the direction of the spring which holds the mirror against the wires. If now any elongation occurs in the wire on the right, that side of the mirror will be drawn down or back by the spring or a deflection to the right is obtained. Likewise if an elongation takes place in the wire on the left the mirror will deflect to the left. If, however, an exactly equal elongation occurs in both wires at the same time, the plane of the mirror will not tilt, but simply move back, keeping parallel to itself.

If the instrument is set up and the mirror is observed with a telescope and scale—say at a meter distance—very minute angular deflections of the mirror may be easily observed, while a sinking back of the plane of the mirror away from the scale will not be observable. If now an alternating current of unknown value be sent through the wire $Wa$ it will expand and the mirror will deflect toward the left. If we pass an adjustable direct current which can be measured through the wire $Wd$, the deflection can be reversed and brought to zero. If when the deflection is zero and certain precautions have been observed we know the value of the direct current, we also know the value of the alternating current, for it is exactly equal to it. This, however, is on the assumption that equal currents through the wires $Wa$ and $Wd$ will produce equal elongations. If, however, previously to matching the currents to each other we connect the wires $Wa$ and $Wd$ in series and run identically the same current through both wires and get no deflection or we get a very small deflection and take the limit of this small deflection as our true zero, we can then be sure that when using the two currents and the same zero is preserved that the two currents are equal. The instrument, however, if limited to such currents as could be passed directly through its wires would have little value comparatively. It will now be shown how it may be used with shunts so as to measure alternating currents however large, for which reference will first be had to Fig. 6, which shows diagrammatically the arrangement of the complete circuits for measuring a large alternating current for the purpose of calibrating an alternating-current ammeter A. An important accessory to the instrument is a quick-acting double-throw switch, (indicated by S in the diagrams.) $Wa$ and $Wd$ represent the two fine wires of the instrument, and M the mirror. R is a low-resistance shunt, preferably of manganin, having a negligible temperature coefficient and furnished with tap-off points $c$ and $d$, between which the resistance R has previously been determined. A M is an ammeter which will measure from one to two amperes of direct current, and $r_s$ a slide-wire resistance along which a slider $p$ may be moved, thereby varying the potential difference at $a\ b$ from zero to the value of the electromotive force of the storage-cell $Ba$.

The points $a\ b$ on the direct-current side of the circuits have leads attached to them which go either to an accurately-calibrated direct-current laboratory standard voltmeter or to a potentiometer. It will later appear that except for the highest possible precision it is more convenient to employ the standard voltmeter; but we assume for the present that a potentiometer is employed to give the potential difference between $a$ and $b$.

When the instrument is installed, a permanent adjustment of the resistances at any convenient temperature of the wires and leads must be made as follows, (see Fig. 6:) The resistances $9\ 10 = 7\ 8$, $10\ 1 + 9\ 5 = 8\ 4 + 7\ 2$, and $2\ c + 4\ d = 3\ a + 6\ b$. Thus while this gives the overall resistances from $a$ through the wire $Wd$ to $b$ equal to the overall resistance from $d$ through the wire $Wa$ to $c$ the different portions of the circuit must be matched in resistance, as stated above. It will be observed that if the switch S is closed on the side A C the two wires $Wa$ and $Wd$ are thrown in parallel, that the two parallel connected circuits have the same resistance by primary construction, and that to these parallel circuits at the points 2 and 4 is applied the same potential difference, this potential difference being the drop over the low resistance R, carrying the alternating current. The drop over R, inasmuch as it is a low resistance, is only slightly lowered by the fact of its being shunted by the two wires of the instrument and their leads, and this lowering of the potential is not appreciably greater when the two wires in parallel shunt the resistance R than when only one wire, with its leads, shunts this resistance. Disregarding this slight lowering of the potential, which, as will later appear, is of no consequence, we observe that both wires will now have passing through them equal currents, each current being nearly the same as would pass through the one wire W$a$ if the switch S were open so that only this wire could receive current. With the resistances of the parallel circuits correctly adjusted to equality both wires will get equal currents, both will expand equally, or very nearly so, and the mirror M, instead of rotating, will move back, maintaining its plane parallel to the position which it has with no current passing. When the switch S is thrown to the position D C, the potential drop over the resistance R is now applied to the wire W$a$ only, while the direct potential difference between the points $a$ and $b$ is now applied to the wire W$d$. This drop between $a$ and $b$ can be varied by the slider $p$ and measured by a voltmeter or potentiometer applied at $a$ $b$. The ammeter A M gives the current taken by the wire W$d$.

Consider now the circuits to be arranged as above described and that we use a standard voltmeter calibrated to give a full-scale deflection for about .75 of a volt to indicate the direct potential between $a$ and $b$. We would then proceed to take measurements to calibrate the alternating-current ammeter A as follows: This ammeter may have any current-carrying capacity whatever above one ampere. A shunt R and tap-off points are first chosen, such that when the ammeter reads a full-scale deflection the drop over the shunt R from $c$ to $d$ is anything from .25 to .6 of a volt, but preferably .5 of a volt. If the ammeter is known to read approximately right, as the value of R is known we can gradually increase the current through the ammeter and shunt resistance until we know we have the proper drop—namely, a potential drop which will give a good sensitiveness to the alternating-current instrument. If, however, the ammeter gives no guide to the value of the current, the switch S may be left in its open position, and the alternating-current instrument can be read as a deflection instrument. In this case the current through R should be increased until the alternating-current instrument deflects to the end of the scale, when the drop over R will be about right for the condition of good sensitiveness. This adjustment being made, the switch S is closed on the A C side, when the A C instrument will take a perfectly steady zero position—very nearly and if carefully made and adjusted exactly the same as the zero position when no current is passing. This zero position is now carefully noted and the switch S is then thrown to the D C side.

The instrument will at once deflect until by moving the slider $p$ the direct potential between $a$ and $b$ is made to balance the alternating potential between $c$ $d$, when the deflection will return it to its zero position. This adjustment can be made with great exactness—say to within one twenty-fifth per cent. The switch S may now be thrown from one side to the other once or twice to prove that the adjustments have been correctly made, which will be the case if no permanent deflections result. The voltmeter is read, also the ammeter A M and the ammeter A being calibrated. These readings give all the data for making a very exact calibration of one point on the scale of the ammeter under test. Other points on the scale can be similarly taken by varying the alternating current and also the shunt resistance R. Inasmuch as by varying this latter we can read a small current with the same precision as a large one, the low points on the scale of the instrument under calibration can be determined with as great precision as the high points.

In practice the direct-current ammeter A M may be omitted. A preliminary set of readings are taken to determine its indications corresponding to the different potentials that may be produced between $a$ and $b$. With a given instrument and set of working wires and leads and voltmeter the current in the circuit $p$ $b$, Fig. 6, is a function of the potential difference between $a$ and $b$. This function may therefore be found by trial and plotted as a curve. This having been done, it only becomes necessary in calibrating an ammeter to take readings, in addition to the instrument being calibrated, of a voltmeter and the zero position of the A C instrument.

Figure 6:
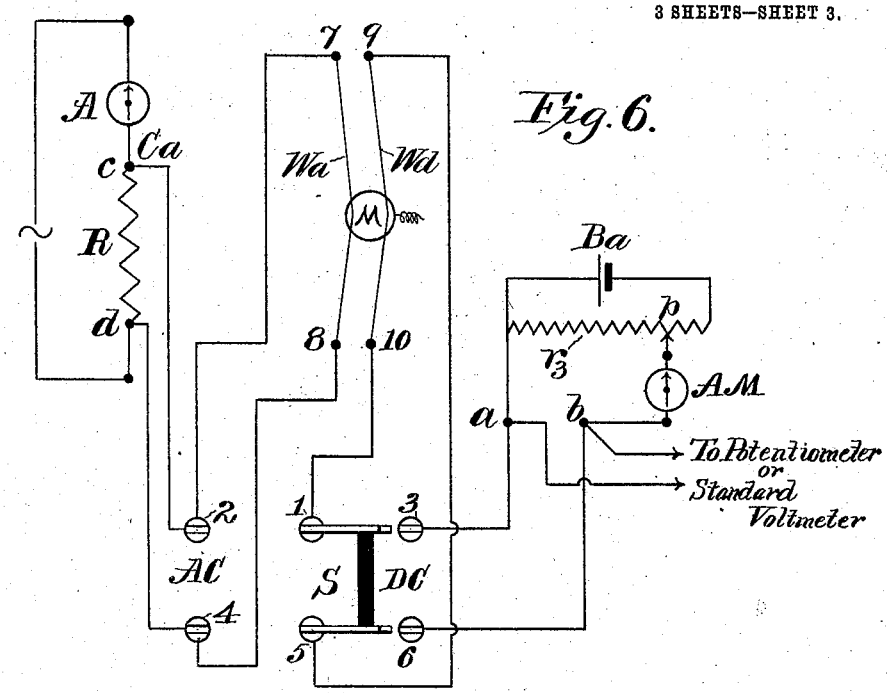
Figure 7:
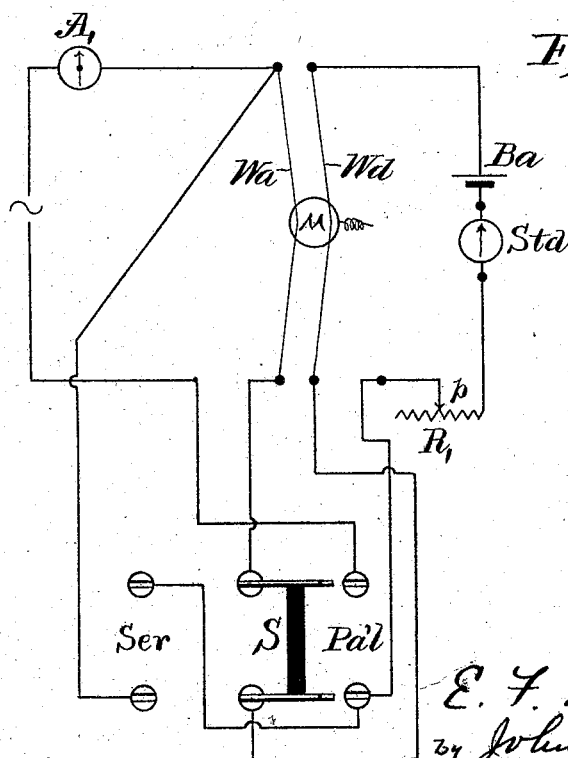

The expression which gives the value of the alternating current C through the ammeter A is $$C a = \frac{r - R}{r\,R} E + C = K E + F (E) \quad (1)$$

where $r$ is the resistance of the voltmeter, R the value of the shunt used, E the potential read on the voltmeter, and C the current in the circuit $p$ to $b$, Fig. 6. K is a constant, and as ten values of R will cover all currents from one to one thousand amperes these values of K can be calculated once for all. Furthermore, by properly choosing the values of R, K can be made to assume simple values, as ten, one hundred, &c. F, (E,) the function of E, is readily taken from a curve and added to the product K E. F (E) is usually small compared with K E and need not be accurately known.

Formula 1 is obtained as follows: Calling X the resistance of the circuit from $c$ to $d$, Fig. 6, through the wire W$a$, we will also have the resistance from $a$ to $b$ through the wire W$d$ equal X when it carries a current equal to that which W$a$ carries. This assumption is quite sufficiently correct, for the two circuits are adjusted to be equal in resistance at room temperature, and as the two circuits are constructed of precisely similar wires the equality of their resistance will be closely maintained when warmed by the passage of equal currents. We then have $Ca = \frac{Ea}{R} + C'$, where $Ea$ is the drop from $c$ to $d$, and $C'$ is the current through $Wa$. Now when the A C instrument is balanced $Ea = E$ where E is the electromotive force read on the voltmeter. Calling $C_1$ the current through $Wd$ when the instrument is balanced and $C_2$ the current through the voltmeter and C the current through the ammeter A M, we have $C = C_1 + C_2$, but $r$ being the resistance of the voltmeter $\frac{C_1}{C_2} = \frac{r}{X}$. Hence $$C_1 = \frac{r}{r+X} C;$$

also, $$\frac{E}{X} = C_1 \text{ or } X = \frac{E}{C_1},$$

which gives $$C_1 = \frac{C\,r - E}{r}.$$

When the instrument is balanced, equal currents flow through the wires $Wa$ and $Wd$, hence $C' = C_1$, and we have $$Ca = \frac{E}{R} + \frac{c\,r - E}{r} = \frac{r - R}{r\,R} E + C.$$

$\frac{r-R}{r\,R} = K$, a constant, and C is a function, F(E) of E, so we can write $Ca = K E + F(E)$. Dividing numerator and denominator of the expression $\frac{r-R}{r\,R}$ by $r$ we have $\frac{1-\frac{R}{r}}{R}$. Thus if $r$ is infinity—that is, if a potentiometer be used to read the potential at $a\,b$ instead of a voltmeter—the value of $Ca$ is $$Ca = \frac{E}{R} + C = \frac{E}{R} + f(E) \quad (2)$$

Here $f(E)$ is the function which C is of E when no current is shunted through a voltmeter and which, as in the use of a voltmeter, may be determined by trial and plotted as a curve.

It is possible to measure E more accurately with a potentiometer than with a voltmeter, and the A C instrument is at least four or five times as sensitive in its indications as a large laboratory standard Weston voltmeter. It is therefore desirable where great precision is desired and the alternating current being measured can be held steady to use a potentiometer instead of a voltmeter. For all ordinary calibration purposes, however, the latter instrument is quite sufficient and easier to read.

If the current to be measured is less than about 1.5 amperes, it can be passed directly through the instrument, no shunts being required.

For the measurement of small currents a modification in the connections and method of measurement is desirable. The connections given in Fig. 7 have been found to be most convenient for this purpose. In this diagram, $A_1$ indicates any alternating-current instrument to be calibrated not taking over 1.5 to 2 amperes and $Std$ any form of accurate standard instrument that will accurately measure a small direct current. Now when the switch S is thrown to the side $Ser$ the wires $Wa$ and $Wd$ are connected so that the same current from the cell $Ba$ will pass through them in series. This current may be regulated by the rheostat $R_1$. When the switch is thrown to the side $Pa'l$, the alternating current will pass through the wire $Wa$ and the direct current through the wire $Wd$.

With the switch in the position $Ser$ the differential zero of the instrument is noted. This zero by careful construction and choosing of the working wires may be made to differ not more than a fraction of a scale-division from the no-current zero. The switch is now thrown to the position $Pa'l$ and the rheostat $R_1$ is adjusted until the instrument shows no deflection from the zero position found when the switch was in the position $Ser$. The switch may now be thrown from side to side once or twice, the rheostat R' being more finely adjusted until there is not the slightest deflection. The value of the alternating current—that is, the square root of its mean square value—is now equal to the direct current as read by the standard instrument $Std$. The accuracy of this comparison can be made very great. If the alternating current is perfectly steady for a period sufficient to read the instruments, one twenty-fifth of one per cent. is not too much to expect for a current the value of which is such as to give the instrument a good sensitiveness.

If it is required to read very small currents, it then becomes necessary to change the wires in the instrument, using finer wires suited to give the necessary sensitiveness. This necessary sensitiveness is always had if when passing the current to be measured through one wire only the instrument gives a nearly full scale deflection.

When the instrument is used in the manner shown in Fig. 6, the best results are obtained if the working wires $Wa\ Wd$ are of low specific resistance and fairly large in diameter and have also a large coefficient of expansion with heat. No. 33 hard-drawn silver wire best fulfils these requirements. When the instrument is used in the manner shown in Fig. 7, the conditions require that the wires $Wa\ Wd$ be of small diameter, of high specific resistance, and with a large coefficient of expansion. A high-resistance wire—such as manganin, kruppin, or the like—best fulfils the requirements in this case. When one-millimeter kruppin wire is used, currents of the order of a few milliamperes can be accurately measured.

The instrument works well with the wires in oil; but on account of the great rate at which oil dissipates the heat it requires a much greater current through the wires for a given deflection than it does with the wires in air.

If the instrument is to be used to measure a current passed directly through it that is somewhat too great for its capacity with a given pair of wires, its capacity can be greatly increased, without changing the wires, by simply filling the case with kerosene-oil, the case being constructed to hold oil for this purpose.

In all cases all wire connections of the instrument should be soldered.

In addition to its adaptation to the measurement of alternating currents within ordinary ranges this instrument may be used for the accurate measurement of such quantities as the current given by a high-frequency coil or the high-frequency currents now used for many experimental purposes, which are produced either by special high-frequency dynamos or by interrupted arcs.

The instrument herein described may be used for measuring either the pressure or quantity of electric current and, in addition thereto, may be used to measure the apparent watts of a circuit. If the instrument is used in the latter capacity, it is necessary either to read the pressure-current with a standard alternating-current voltmeter or to employ two instruments such as herein described. In the latter case one of these instruments would be fitted with shunts and would give the value of the series current however great, and the other instrument would be supplied with fine wires and a series resistance, with which arrangement it would become a voltmeter reading the pressure-current.

It may be finally said that the instrument constituting the subject of my present invention possesses in addition to those heretofore set forth the following advantageous and useful features: It is inexpensive as compared with an outfit of Siemens' electrodynamometer, which when constructed for measuring large currents is very costly both to make and to calibrate. My improved instrument is very simple and easy to understand and manipulate, is not delicate, and is uninfluenced by the proximity of iron or other ordinarily disturbing influences. For work of not too precise a character a pointer may be readily substituted for the mirror, and the instrument may thus be made portable. It does not have to be used in a situation free from vibrations, and if any injury happens to its working parts these may be readily gotten at for repair or replacement. Finally, such an instrument is especially adapted to the important commercial need of being able to keep in accurate calibration the large standard instruments which determine the cost of electrical power to consumers.

What I claim as my invention is—

1. The method of measuring an alternating current, which consists in passing current from the alternating current to be measured through one conductor and a direct current of comparison through another conductor, and adjusting the current through one of said conductors until the relative expansion of both conductors shows that the current value of the alternating current bears a known relation to that of the direct current of comparison.

2. The method of measuring an alternating current, which consists in passing current from the alternating current to be measured through one conductor and a direct current of comparison through another conductor, and adjusting the current through one of said conductors until the relative expansion of said conductors due to the heating effect of said currents shows that equal currents are passing through both.

3. The method of measuring an alternating current, which consists in passing current from the current to be measured through two conductors and establishing by the relative expansion of said conductors due to the current through them, a zero position of indication, passing current from the alternating current to be measured through one of said conductors only and a direct current of comparison through the other of said conductors, and adjusting the current through one of said conductors until the relative expansion of said conductors due to the current therethrough shows that equal currents are passing through both.

4. The method of measuring an alternating current, which consists in passing current through two conductors and establishing by the relative expansion of said conductors due to current therethrough, a zero position of indication, passing current from the alternating current to be measured through one of said conductors, and a direct current of comparison through the other of said conductors, and adjusting the current through one of said conductors until both expand equally.

5. The method of measuring an alternating current, which consists in passing current through two conductors and establishing by the relative expansion of said conductors due to current therethrough, a zero position of indication, passing current shunted from the alternating current to be measured through one of said conductors, and a direct current of comparison through the other of said conductors, and adjusting the current through one of said conductors until both expand equally.

6. The method of measuring an alternating current, which consists in passing current equal in amount through two conductors and establishing by the equal expansion of said conductors due to said current, a zero position of indication, passing the alternating current to be measured through one of said conductors and a direct current of comparison through the other of said conductors, and adjusting the current of comparison until the said conductors show that equal currents are passing through both.

7. The method of measuring an alternating current, which consists in passing current equal in amount through two conductors and establishing by the equal expansion of said conductors due to said current, a zero position of indication, passing current shunted from the alternating current to be measured through one of said conductors and a direct current of comparison through the other of said conductors, and adjusting the current of comparison until the said conductors show that equal currents are passing through both.

8. In an electrical measuring instrument, two conductors mounted for movement due to the heating effect of electric currents, and indicating means operatively connected to both conductors to show the relative heating effects of currents therein.

9. In an electrical measuring instrument, two conductors mounted for movement due to the heating effect of electric currents, a shunt traversed by the current being measured connected to one of said conductors, and indicating means operatively connected to both of said conductors.

10. In an electrical measuring instrument, supports having therebetween a space, two conductors insulated one from the other, adapted to form parts of independent circuits and spanning the space between said supports, and indicating means operatively connected to both conductors between said supports to show the relative heating effects of simultaneous currents in said conductors.

11. In an electrical measuring instrument, a supporting-frame, two conductors both adapted to carry electric currents, extending longitudinally of said frame and insulated one from the other, clamping means holding the ends of said conductors rigidly near the ends of said frame, and indicating means operatively connected to both conductors to show the relative heating effects of said currents on said conductors.

12. In an electrical measuring instrument, a supporting-frame, two conductors extending longitudinally of said frame and insulated one from the other, clamping means holding the ends of said conductors rigidly near the ends of said frame, and a mirror operatively connected to both conductors to be moved angularly by the unequal expansion of said conductors to indicate unequal heating effects therein.

13. In an electrical measuring instrument, supports having therebetween a space, two conductors insulated one from the other and spanning the space between said supports, means connected to said conductors at a point between said supports and acting to keep said conductors taut, and indicating means operatively connected to both conductors between said supports.

14. In an electrical measuring instrument, a supporting-frame, two conductors extending longitudinally of said frame and insulated one from the other, clamping means holding the ends of said conductors rigidly near the ends of said frame, a containing-case, and means to support said frame in said case, and indicating means operatively connected to both conductors to show the relative heating effects of simultaneous currents upon said conductors.

15. In an electrical measuring instrument, two insulated conductors, supports to which the ends of said conductors are made fast, said supports having a space between them spanned by said conductors, means to adjust the relative positions of said supports to vary the distance between them lengthwise of said conductors, a spring arranged to keep said conductors taut, and an indicating device operatively connected to both of said conductors to show the relative heating effects of currents on said conductors.

16. In an electrical measuring instrument, a frame having a fixed and an adjustable support with a space therebetween, two wires made fast at their ends to said supports and spanning the said space, a spring operatively connected to said wires and to said frame to hold said wires taut, and an indicating device operatively connected to both of said wires to show the relative heating effects of currents on said wires.

17. In an electrical measuring instrument, an elongated frame having at one end a fixed support projecting therefrom, adjusting-screws carried at the other end of said frame, supports mounted on said adjusting-screws, two insulated wires made fast at their ends to said fixed and adjustable supports and spanning the space therebetween, a spring operatively connected to said wires and to said frame to hold said wires taut, a mirror operatively connected to both of said wires, a containing-case for said frame and its connected parts having an opening arranged to register with said mirror, a cover for said case to which said frame is secured, and connecting-terminals.

18. In a hot-wire electrical measuring instrument, two current-carrying electrical conductors, abutments between which said conductors extend for support, and means connected to said conductors and operative thereby to indicate the comparative heating effects of currents passing simultaneously through said conductors.

19. In a hot-wire electrical measuring instrument, a plurality of electrical conductors mounted for movement due to the heating effect of electrical currents, and indicating means operatively connected to said conductors for movement due to the difference in expansion of said conductors to indicate unequal heating effects of currents therein.

20. In a hot-wire electrical measuring instrument, two current-carrying conductors, abutments between which said conductors extend for support, and indicating means connected to both of said conductors to move angularly when the heating effects of the currents in both conductors are unequal, and to maintain a position of zero angular deflection when the heating effects of said currents are equal.

21. In a hot-wire instrument for the comparative measurement of electric currents, two conductors, one to carry current from the current to be measured and the other to carry a current of comparison, abutments between which said conductors extend for support, and means connected to said conductors to indicate by its angular position the comparative heating effects of the currents in the respective conductors.

22. In a hot-wire instrument for the comparative measurement of electric currents, two conductors, one to carry current from the current to be measured and the other to carry a current of comparison, abutments between which said currents extend for support, a shunt adapted to be connected in circuit with the conductor carrying the current to be measured and means connected to said conductors for movement by the unequal expansion thereof to indicate unequal heating effects of currents therein, and for movement by the equal expansion of said conductors to indicate the equality of the heating effects of currents therein.

23. In a hot-wire instrument for the comparative measurement of electric currents, two conductors, one to carry current from the current to be measured and the other to carry a current of comparison, abutments between which said conductors extend for support, a shunt adapted to be connected in circuit with the conductor carrying the current from that which is to be measured, means connected to said conductors to indicate by its angular position the comparative heating effects of the currents in the respective conductors, and a switch and connections for passing current from the same source through both conductors to establish a zero position of deflection and for passing the respective currents through the said conductors for comparison.

24. In a hot-wire electrical measuring instrument, two electrically-disconnected hot-wires, abutments between which said wires extend for support alongside each other, means to keep said wires taut, and a rigid indicating body attached to both of said wires to have an angular deflection due to the difference in expansion of said wires and to have a zero angular deflection when said wires expand equally.

In testimony whereof I affix my signature in presence of two witnesses.

EDWIN F. NORTHRUP.

Witnesses:
 Jos. Walker,
 Geo. W. Clement.